(12) United States Patent
Nishikawa et al.

(10) Patent No.: US 7,693,879 B2
(45) Date of Patent: Apr. 6, 2010

(54) DATABASE SYSTEM INCLUDING CENTER SERVER AND LOCAL SERVERS

(75) Inventors: Norifumi Nishikawa, Machida (JP); Kazuhiko Mogi, Yokohama (JP); Hideomi Idei, Yokohama (JP); Yoshiaki Eguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 11/706,245

(22) Filed: Feb. 15, 2007

(65) Prior Publication Data

US 2007/0143362 A1    Jun. 21, 2007

Related U.S. Application Data

(63) Continuation of application No. 10/634,993, filed on Aug. 6, 2003, now Pat. No. 7,197,519.

(30) Foreign Application Priority Data

Nov. 14, 2002  (JP)  ............................... 2002-330731

(51) Int. Cl.
*G06F 17/30* (2006.01)
(52) U.S. Cl. .................. 707/202; 707/203; 707/204; 711/162
(58) Field of Classification Search .................. 707/202, 707/203, 204; 711/162
See application file for complete search history.

(56) References Cited

U.S. PATENT DOCUMENTS

| 5,692,155 | A | 11/1997 | Iskiyan et al. |
| 5,757,669 | A | 5/1998 | Christie et al. |
| 5,974,135 | A | 10/1999 | Breneman et al. |
| 6,185,601 | B1 | 2/2001 | Wolff |
| 6,192,365 | B1 | 2/2001 | Draper et al. |
| 6,199,074 | B1 * | 3/2001 | Kern et al. ................. 707/204 |

(Continued)

FOREIGN PATENT DOCUMENTS

EP    1058190    12/2000

(Continued)

OTHER PUBLICATIONS

Burkes et al "Design Approaches for Real-Time Transaction Processing Remote Site Recovery", Proceedings of the IEEE Spring CompCon Conference, pp. 568-572 (1990).

(Continued)

*Primary Examiner*—Apu M Mofiz
*Assistant Examiner*—Monica M Pyo
(74) *Attorney, Agent, or Firm*—Brundidge & Stanger, P.C.

(57) ABSTRACT

A database system includes a center server and local servers. The center server includes a replication requesting unit, a data consolidating unit including a center DB freeze requesting unit and a center DB freeze release requesting unit, a replication source managing table and a data consolidation completion notifying unit. Each of the local servers includes a local DB freeze requesting unit, a remote volume split requesting unit, a remote volume split completion notifying unit and a local DB freeze release requesting unit. The center server permits replications of local DB's in local storage subsystems to be created in the center storage subsystem and accesses shadow images of the replications to give a consolidated access to the plurality of local DB's.

2 Claims, 4 Drawing Sheets

U.S. PATENT DOCUMENTS

| | | | |
|---|---|---|---|
| 6,263,053 B1 | 7/2001 | Kuftedjian et al. | |
| 6,308,284 B1 | 10/2001 | LeCrone et al. | |
| 6,370,626 B1 | 4/2002 | Gagne et al. | |
| 6,539,462 B1 | 3/2003 | Mikkelsen et al. | |
| 6,581,143 B2 | 6/2003 | Gagne et al. | |
| 6,643,671 B2 | 11/2003 | Milillo et al. | 707/204 |
| 6,647,474 B2 | 11/2003 | Yanai et al. | |
| 6,651,075 B1 | 11/2003 | Kusters et al. | |
| 6,697,881 B2 | 2/2004 | Cochrane | |
| 6,708,227 B1 | 3/2004 | Cabrera et al. | |
| 6,708,285 B2 | 3/2004 | Oldfield et al. | |
| 6,721,851 B2 | 4/2004 | Ohr | |
| 6,754,682 B1 | 6/2004 | LeCrone et al. | |
| 6,789,178 B2 | 9/2004 | Mikkelsen et al. | |
| 6,792,436 B1 | 9/2004 | Zhu et al. | |
| 6,799,189 B2 * | 9/2004 | Huxoll | 707/204 |
| 6,799,258 B1 | 9/2004 | Linde | |
| 7,089,386 B2 | 8/2006 | Suzuki et al. | |
| 7,093,087 B2 | 8/2006 | Suzuki et al. | |
| 2001/0056554 A1 | 12/2001 | Chrabaszcz | |
| 2002/0042818 A1 | 4/2002 | Helmer et al. | |
| 2002/0095489 A1 | 7/2002 | Yamagami | |
| 2002/0129203 A1 | 9/2002 | Gagne et al. | |
| 2002/0143791 A1 | 10/2002 | Levanon et al. | |
| 2003/0009707 A1 | 1/2003 | Pedone et al. | |
| 2003/0014432 A1 | 1/2003 | Teloh et al. | |
| 2003/0149709 A1 | 8/2003 | Banks | |
| 2003/0163655 A1 | 8/2003 | McKean et al. | |
| 2003/0172149 A1 | 9/2003 | Edsall et al. | |
| 2003/0217077 A1 | 11/2003 | Schwartz et al. | |
| 2004/0054684 A1 | 3/2004 | Geels | |
| 2004/0103261 A1 | 5/2004 | Honda et al. | |
| 2004/0133752 A1 | 7/2004 | Suzuki et al. | |
| 2004/0139235 A1 | 7/2004 | Rashid et al. | |
| 2004/0250021 A1 | 12/2004 | Honda et al. | |
| 2005/0251636 A1 | 11/2005 | Suzuki et al. | |
| 2006/0168412 A1 | 7/2006 | Suzuki et al. | |

FOREIGN PATENT DOCUMENTS

| | | |
|---|---|---|
| EP | 1255198 | 11/2002 |
| JP | 8305500 | 11/1996 |
| JP | 11327803 | 11/1999 |
| JP | 2001318833 | 11/2001 |

OTHER PUBLICATIONS

Microsoft Computer Dictionary, 2002, Microsoft Press, 5$^{th}$, Ed., p. 216.

"Data Joiner" IBM DB2 DataJoiner, IBM, 2000.

Marc Farley, "Building Storage Networks" pp. 118-124, Osbone/McGraw-Hill, 2001.

H. Matsushima, et al "Storage Solution 'Storeplaza' Supporting Digital Economy, Solutions Protecting and Sharing Important Management Resources", May 1, 2001, vol. 83, No. 5, pp. 14.

"HiRDB Version 6", Hitachi, Ltd., 2001.

"Information Integration—Distributed Access and Data Consolidation", IBM, 2003.

"Addressing Federal Government Disaster Recovery Requirements with Hitachi Freedom Storage", Hitachi, Nov. 2002.

"Hitachi Data Systems Enhances Freedom Storage 7700E; Introduces New Business Continuity Software Providing Bulletproof Foundation for E-commerce-Product Announcement", Feb. 21, 2000, Edge: Work-Group Computing Report, pp. 1-3.

T. Sullivan, "Hitachi to Bring High-End Storage Features to 'Windows 2000-Hitachi Data Systems Freedom Storage 7700E Storage Subsystem—Product Announcement", Mar. 22, 2000; ENT, pp. 1-2.

I. Slepner, "Hitachi Data Systems Introduces Freedom Lighting 9900—Product Announcement", Jul. 19, 2000; ENT, p. 1.

H. Yoshida, et al, The Hitachi Freedom Storage Lighting 9900 for Optimazed Storage Area Networks: Jun. 2000, Hitachi Data System, pp. 1-9.

H. Yoshida, "Lun Security Considerations for Storage Area Networks", 1999, Hitachi Data Systems, pp. 1-7.

* cited by examiner

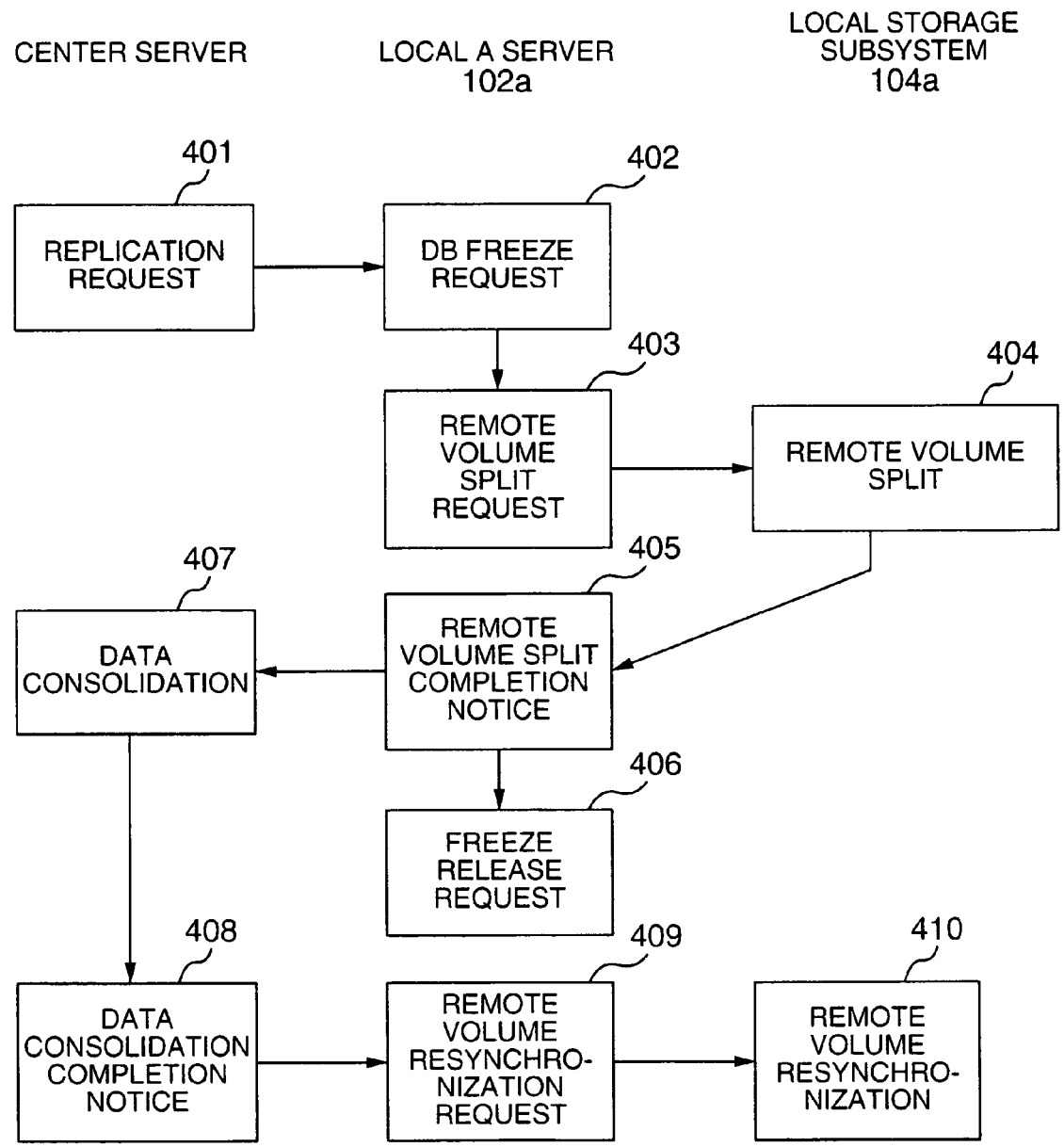

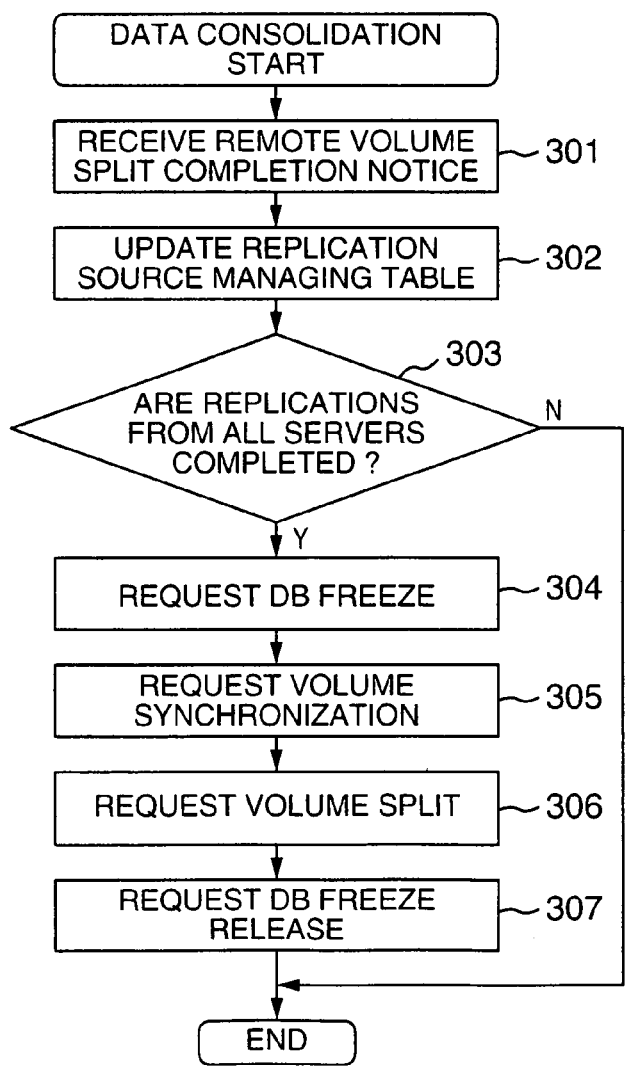

FIG. 5

| REPLICATION SOURCE DATABASE NAME | REPLICATION COMPLETION FLAG | |
|---|---|---|
| LOCAL A DATABASE | FINISHED | ~203a |
| LOCAL B DATABASE | UNFINISHED | ~203b |

FIG. 6

| REPLICATION SOURCE DATABASE NAME | REPLICATION COMPLETION FLAG | |
|---|---|---|
| LOCAL A DATABASE | FINISHED | ~203a |
| LOCAL B DATABASE | FINISHED | ~203b |

DATABASE SYSTEM INCLUDING CENTER SERVER AND LOCAL SERVERS

The present application is a continuation of application Ser. No. 10/634,993, filed Aug. 6, 2003, now U.S. Pat. No. 7,197,519 the contents of which are incorporated herein by reference.

BACKGROUND OF THE INVENTION

The present invention relates to a database system and a method for accessing a center server and a database and more particularly, to a database system for replicating databases in a single or a plurality of storage subsystems which are connected to a network and located remotely and permitting replicated databases to be accessed in a consolidated fashion and a method for accessing a center server and databases in that system.

As a conventional technique concerning a method for replicating a remotely located database, a technique of database replication has been known in which data is replicated between servers mutually connected through a LAN or WAN. As another conventional technique, a technique of database hub has been known according to which inquiries are made to distributed database management systems during execution of the inquires and results returned from the individual database management systems are consolidated so as to be exhibited as one result. Further, known as still another conventional technique directed to preparation of a replication of a database at a remote location is a technique of disaster recovery using a volume replication function owned by a storage device.

Known as a prior art concerning the database hub is a technique described in "Data Joiner", International Business Machines Corporation, 2000 and known as prior arts concerning the disaster recovery are techniques described in "Building Storage Networks" by Marc Farley, second edition, Osbone/McGraw-Hill Corp., 2001, pp. 118-124 and described in "HiRDB version 6", Hitachi Com. Software Department, 2001.

When a method based on the aforementioned database replication is used as means for getting a consolidated access to a plurality of databases at remote locations, the LAN or WAN is used for transfer of data, raising a problem that much time is consumed for replication of data. In a method using the database hub, the remotely located database management systems are accessed during execution of inquiries, with the result that the response time is degraded and besides, when a large number of results are brought about, a large amount of data must be transferred through the medium of the LAN or WAN, giving rise to a problem that the search performance is degraded. In addition, the method of disaster recovery using the volume replication function the storage unit has is backup for a database on the replication side to recover and disadvantageously, it cannot afford to consolidate a plurality of databases.

SUMMARY OF THE INVENTION

It is an object of the present invention to provide a database system for permitting a plurality of databases at remote locations to be accessed instantaneously in a consolidated fashion and a method for accessing a center server and databases in the system.

According to the invention, to accomplish the above object, in a database system comprising a center server, a single or a plurality of local servers, a first network for mutually connecting the center server and the local servers, local storage subsystems for storing local databases managed by the local servers, a center storage subsystem for storing replications of the local databases and a second network for mutually connecting the center server, the center storage subsystem, the local servers and the local storage subsystems, the center server includes a replication requesting unit for requesting the local servers to replicate local databases and a data consolidating unit for performing a process of consolidating the replicated local databases, and each of the local servers includes a local database freeze requesting unit responsive to a database replication request from the center server to request a database management system to freeze the local database and a database replicating unit for causing the local storage subsystem to replicate, in the center storage subsystem, the local database the local storage subsystem stores.

Also to accomplish the above object, in a method for accessing a database system comprising a center server, a single or a plurality of local servers, a first network for mutually connecting the center server and the local servers, local storage subsystems for storing local databases managed by the local servers and a second network for mutually connecting the center server, the center storage subsystem, the local servers and the local storage subsystems, the center server requests the local servers to replicate the local databases and performs a process of consolidating the replicated local databases, and each of the local servers responds to a database replication request from the center server to request a database management system to freeze the local database and causes the local storage subsystem to replicate, in the center storage subsystem, the local database the local storage subsystem stores.

Other objects, features and advantages of the invention will become apparent from the following description of the embodiments of the invention taken in conjunction with the accompanying drawings.

BRIEF DESCRIPTION OF THE DRAWINGS

FIG. 2 is a flowchart for explaining a process in which synchronization between each shadow image and each local DB is set up and data of a plurality of local DB's is accessed in a consolidated fashion through a center DBMS.

FIG. 3 is a table for explaining an example of structure of a replication source managing table provided in a center server.

FIG. 4 is a flowchart for explaining a process executed by a data consolidating unit in the center server (a process in step 407 explained in connection with FIG. 2).

FIG. 5 is a table showing an example of the replication source managing table after completion of synchronization of only a DB at area A.

FIG. 6 is a table showing an example of the replication source managing table after completion of synchronization of two DB's at areas A and B.

DESCRIPTION OF THE EMBODIMENTS

Figure 1:
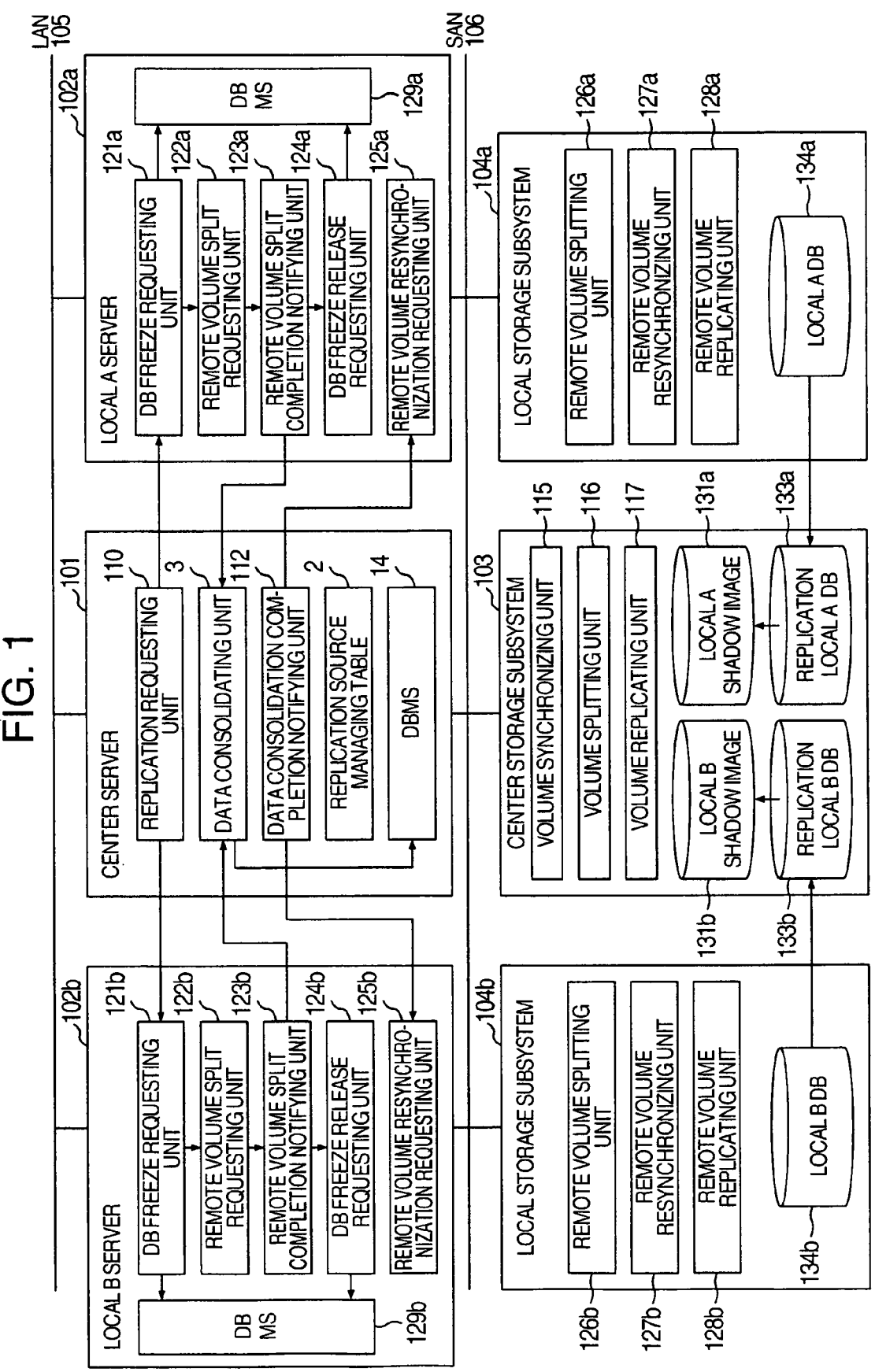
FIG. 1 is a block diagram showing the construction of a database system according to an embodiment of the invention.

Embodiments of database system an method for accessing databases according to the invention will be described hereunder in greater detail with reference to the drawings.

FIG. 1 is a block diagram showing the construction of a database system according to an embodiment of the invention. In FIG. 1, reference numeral 101 designates a center server, 102a and 102b local servers, 103 a center storage subsystem, 104a and 104b local storage subsystems, 105 a LAN, 106 a SAN (storage area network), 110 a replication requesting unit, 112 a data consolidation completion notifying unit, 2 a replication source managing table, 3 a data consolidating unit, 14, 129a and 129b database management systems (BDMS's), 115 a volume synchronizing unit, 116 a volume splitting unit, 117 a volume replicating unit, 121a and 121b DB (database) freeze requesting units, 122a and 122b remote volume split request units, 123a and 123b remote volume split completion notifying units, 124a and 124b DB freeze release requesting units, 125a and 125b remote volume resynchronization requesting units, 126a and 126b remote volume splitting units, 127a and 127b remote volume resynchronizing units, 128a and 128b remote volume replicating units, 131a and 131b local shadow images, 133a and 133b replication local DB's, and 134a and 134b local DB's.

The database system according to one embodiment of the invention comprises, as shown in FIG. 1, the center server 101, local servers 102a and 102b provided in a plurality areas A and B, center storage system 103, local storage subsystems 104a and 104b provided in the plurality of areas A and B, LAN 105 serving as the first network for connecting the center server 101 with the local servers 102a and 102b, and SAN 106 serving as the second network for connecting the center server 101 with the local servers 102a and 102b, center storage subsystem 103 and local storage subsystems 104a and 104b.

In the above construction, the center server 101 includes replication requesting unit 110, data consolidating unit 3, data consolidation completion notifying unit 112, replication source managing table 2 and database management system (DBMS) 14. Then, the center storage subsystem 103 includes volume synchronizing unit 115, volume splitting unit 116, volume replicating unit 117, replication local databases 133a and 133b representing replications of the local databases 134a and 134b and shadow images 131a and 131b of the replication local databases 133a and 133b.

Each of the local servers 102a and 102b includes local database freeze requesting unit 121a or 121b, remote volume split requesting unit 122a or 122b, remote volume split completion notifying unit 123a or 123b, local DB freeze release requesting unit 124a or 124b, remote volume resynchronization requesting unit 125a or 125b and local DBMS 129a or 129b. Then, each of the local storage subsystems 104a and 104b includes remote volume splitting unit 126a or 126b, remote volume resynchronizing unit 127a or 127b, remote volume replicating unit 128a or 128b and local DB 134a or 134b.

The local servers 102a and 102b are provided in the areas A and B, respectively, and the local DBMS's 129a and 129b incorporated in the respective local servers manage the local DB's 134a and 134b, respectively, which are provided in the corresponding local storage subsystems 104a and 104b, respectively.

In the DB system according to the embodiment of the invention constructed as above, information for updates applied to the local DB's of local storage subsystems 104a and 104b (hereinafter referred to as update information) is transmitted asynchronously to the center storage subsystem 103 by means of the remote volume replicating units 128a and 128b, respectively. The volume replicating unit 117 of the center storage subsystem 103 receiving the update information asynchronously reflects the received update information upon the replication local DB's 133a and 133b. In the case of an example shown in FIG. 1, an update applied to the local DB 134a in the area A is reflected upon the replication local DB 133a and an update applied to the local DB 134b in the area B is reflected upon the replication local DB 133b. Synchronization between local DB 134a and replication local DB 133a and that between local DB 134b and replication local DB 133b are set up by causing the remote volume splitting units 126a and 126b to stop the reflection of the update information.

The center DBMS 14 incorporated in the center server 101 manages the local shadow images 131a and 131b incorporated in the center storage subsystem 103. These shadow images 131a and 131b are those of the replication local DB's 133a and 133b, respectively. In the case of the example shown in FIG. 1, the center DBMS 14 manages the two shadow images of local shadow images 131a and 131b. The volume synchronizing unit 115 of the center storage subsystem 103 reflects the update information, which has been reflected upon the replication local DB's 133a and 133b, upon the local shadow images 131a and 131b.

In the embodiment of the invention described previously, the center server and each local server respectively include a CPU, a memory, a disk device and a driver for external storage medium, which are not shown and are interconnected through a communication path such as a bus. Also, the center storage subsystem and each local storage subsystem respectively include, in addition to the above components, a DB or DB's held in the disk device. Then, the individual functional components constituting the aforementioned servers and storage subsystems are implemented when a program stored in the disk device or external storage medium is written to the memory and executed by the CPU. It is to be noted that only two sets of local servers and local storage subsystems are shown in FIG. 1 but they may be provided in more increased number.

FIG. 2 is a flowchart for explaining a process in which synchronization between the shadow image 131a managed by the center DBMS 14 and the local DB 134a managed by the local DBMS 129a and that between the shadow image 131b managed by the center DBMS 14 and the local DB 134b managed by the local DBMS 129b are established and data of the plurality of local DB's are accessed in a consolidated fashion through the center DBMS 14. FIG. 2 is depicted by way of example of a process operation in the center server 101, local A sever 102a and local storage subsystem 104a but the same process may be carried out in the local B server 102b and local storage subsystem 104b.

(1) When a request for consolidated access to data of the plurality of local DB's is made, the replication requesting unit 110 of the center server 101 transmits a replication request for requesting all the local servers 102a and 102b to start replication (step 401).

(2) The DB freeze requesting units 121a and 121b of the local servers 102a and 102b receiving the replication request transmitted in the step 401 make a request to the local DBMS's 129a and 129b for freeze of the local DB's 134a and 134b. "Freeze" referred to herein means a process in which the whole of the update information on buffers in the DBMS's existing on the local servers 102a and 102b is reflected to the local DB's 134a and 134b and any update subsequently applied to the buffers is inhibited from being reflected upon the local DB's 134 (step 402).

(3) Thereafter, the remote volume split requesting units 122a and 122b of the local servers 102a and 102b request the local storage subsystems 104a and 104b to perform split between local DB 134a and replication local DB 133a and that between local DB 134b and replication local DB 133b. Here, "split" signifies that transfer of the update information to the replication local DB's is stopped (step 403). The updates applied to the local DB's are stored in the local storage subsystems 104.

(4) The local storage subsystems 104a and 104b receive the request in the step 403 and the remote volume splitting units 126a and 126b stop transfer of the information for updates applied to the local DB's 134a and 134b to the replication local DB's and perform a process of remote volume split in which the information of updates applied to the local DB's 134a and 134b is stored in the local storage subsystems of their own (step 404).

(5) When the process for remote volume split in the step 404 is completed, the remote volume split completion notifying units 123a and 123b of the local servers 102a and 102b receive a report to this effect and transfer the fact that the volume split is completed to the center server 101 through the medium of a remote volume split completion notice (step 405).

(6) Thereafter, the DB freeze release requesting units 124a and 124b of the local servers 102a and 102b make a request to the local DBMS's 129 for release of the local DB freeze (step 406).

(7) On the other hand, the center server 101 receives the volume split completion notice in the step 405 and the data consolidating unit 3 executes a process for data consolidation. As will be described later, through the data consolidation process, the contents of the local DB's 134a and 134b are reflected on the shadow images 131a and 131b and after completion of this process, a consolidated access can be ensured by accessing the shadow images 131a and 131b by way of the center DBMS 14 (step 407).

(8) With the process in the step 407 completed, the data consolidation completion notifying unit 112 of the center server 101 informs all of the local servers 102a and 102b that the data consolidation is completed (step 408).

(9) The local servers 102a and 102b receive the notice of data consolidation completion in the step 408 and the remote volume resynchronization requesting units 125a and 125b request the local storage subsystems 104a and 104b to execute remote volume resynchronization for performing resynchronization of the remote volumes. "Resynchronization" referred to herein is a process in which the update information stored in the local storage subsystems as a result of the aforementioned split process is transferred to the center storage subsystem 103 so that the update information may be reflected upon the replication local DB's 133a and 133b(step 409).

(10) The local storage subsystems 104a and 104b receive the request for remote volume resynchronization and the remote volume resynchronizing units 127a and 127b transfer the update information stored in the local storage subsystems of their own to the center storage subsystem 103 to enable it to perform the resynchronization process for reflecting the update information upon the replication local DB's 133a and 133b. After the resynchronization, the updates applied to the local DB's 134a and 134b are asynchronously transferred to the center storage subsystem 103 and besides reflected on the local DB's 133a and 133b asynchronously by the volume replicating unit 117 (step 410).

FIG. 3 is a table for explaining an example of structure of the replication source managing table 2 provided in the center server 101. The shown replication source managing table 2 includes a replication source DB name field 201 indicative of names of replication source servers and a replication completion flag 202 indicating whether a replication between local DB 134a and replication local DB 133a and that between local DB 134b and replication local DB 133b are completed.

All flags 202 are initialized with "unfinished" when the replication requesting unit 110 starts the process. In the example shown in FIG. 3, there are records 203a and 203b, with the record 203a indicating that synchronization between the local DB 134a managed by the local DBMS 129a of local A server 102a and the replication local DB 133a is not finished and with the record 203b indicating that synchronization between the local DB 134b managed by the local DBMS 129b of local B server 102b and the replication local DB 133b is not finished.

FIG. 4 is a flowchart for explaining a process executed in the data consolidating unit 3 provided in the center server 101 (the process in the step 407 explained in connection with FIG. 2). The process for data consolidation will now be described with reference to FIG. 4.

(1) When receiving a remote volume split request completion notice from one of the local servers 102a and 102b through the LAN 105 representing the first network, the data consolidating unit 3 searches or retrieves, from the replication source managing table 2, a record 203a or 203b corresponding to a name at replication source DB name field 201 on the basis of the name of the local server 102a or 102b which has transmitted the notice and changes the value of replication completion flag field 202 at the corresponding record 203a or 203b to "finished" (steps 301 and 302).

(2) Next, it is checked whether the values of replication completion flag field 202 at all records 203a and 203b stored in the replication source managing table 2 are "finished" in order to check whether notices of split completion, that is, replication completion from all the local servers are received. If even a single "unfinished" record exists, the process is ended to wait for a notice of split completion from another local server (step 303).

(3) In case the values of replication completion flag field 202 are determined to be "finished" through checking in the step 303, a request is made to the center DBMS 14 for freeze of the shadow images 131a and 131b managed by the DBMS 14. "Freeze" referred to herein is a process in which all updates on a buffer in the DBMS 14 existing on the center server 101 are reflected to the shadow images 131a and 131b and any update subsequently applied to the buffer is inhibited from being reflected upon the shadow images 131 (step 304).

(4) Thereafter, a volume synchronization request is made to the volume synchronizing unit 115 of center storage subsystem 103. The volume synchronizing unit 115 receiving the request reflects the updates applied to the replication local DB's 133a and 133b from the local storage subsystems 104a and 104b upon the shadow images 131a and 131b. With the reflection upon the shadow images completed, a request for volume split is made to the volume splitting unit 116 of center storage subsystem 103 to perform split between the shadow image 131a and the replication local DB 133a and that between the shadow image 131b and the replication local DB 133b (steps 305 and 306).

(5) The volume splitting unit 116 receiving the volume split request performs split between each of the shadow images 131 and each of the replication local DB's 133. Thereafter, a request is made to the center DBMS 14 for release of freeze (step 307).

FIG. 5 shows an example of the replication source managing table 2 after synchronization of only the DB at local area A has completed and FIG. 6 shows an example of the replication source managing table 2 after synchronization of the two DB's at local areas A and B.

Next, an example of operation of the data consolidating unit 3 when the two local DB's at local areas A and B shown in FIG. 1 are replicated in the center storage subsystem 103 and replications are accessed from the center server 101 in a consolidated fashion will be described using the examples of replication source managing table 2 shown in FIGS. 3, 5 and 6.

Firstly, when the data consolidating unit 3 receives a notice of remote volume split completion from the local A server 102*a* (step 301), it changes, through the process of step 302, the replication source managing table, which has already been explained in connection with FIG. 3, in such a manner that the value of replication completion flag field 202 at record 203*a* indicating whether a replication of the local DB 134*a* at area A is completed is changed to "finished" as shown in FIG. 5 (step 302). The fact that the record 203*a* is a record indicative of replication completion of the local DB 134*a* at area A can be determined from the fact that the value of replication source DB name field 201 corresponding to this record is "DB at area A".

It is subsequently checked through the process of step 303 if the values of replication completion flag field 202 of the table 2 are all "finished". In this phase, the status of table 2 is as shown in FIG. 5, so that the decision result is "No" and the process ends.

Next, when the data consolidating unit 3 receives a remote volume split completion notice from the local B server 102*b* (step 301), it changes through the process of step 302 the replication source managing table 2 shown in FIG. 5 such that the value of replication completion flag field 202 at record 203*a* indicating whether a replication of the local DB 134*b* at area B is completed is changed to "finished" as shown in FIG. 6 (step 302).

Next, it is checked through the process of step 303 if the values of replication completion flag field 202 of table 2 are all "finished". In this phase, the table 2 is conditioned as shown in FIG. 6 and the decision result is "Yes" (step 303).

Thereafter, a request is made to the center DBMS 14 for freeze of the center DB's (shadow images 131*a* and 131*b*) through the process of step 304. Then the volume synchronizing unit 115 of center storage subsystem 103 is requested to synchronize replication local DB 133*a* with shadow image 131*a* and to synchronize replication local DB 133*b* with shadow image 131*b* (step 305).

With the synchronization completed, the volume splitting unit 116 of center storage subsystem 103 is requested to split the replication local DB 133*a* from the shadow image 131*a* and to split the replication local DB 133*b* from the shadow image 131*b* (step 306). Thereafter, a request is made to the center DBMS 14 for release of freeze of the center DB's (step 307).

The individual processes according to the embodiment of the invention described so far can be implemented with a process program, which process program can be stored in a recording medium such as HD, DAT, FD, MO, DVD-ROM or CD-ROM and can be presented.

As described above, in the embodiment of the invention, starting from a status in which updates are applied asynchronously from the local DB's 134*a* and 134*b* to the replication DB's 133*a* and 133*b* representing replications of the local DB's, the local DB's 134*a* and 134*b* are first frozen on the basis of a replication request so as to be placed in matched condition and then the local DB 134*a* is split from the replication local DB 133*a* and the local DB 134*b* is split from the replication local DB 133*b*, so that the replication local DB's 133*a* and 133*b* can instantaneously be placed in synchronized condition. On the side of local servers 102*a* and 102*b*, the DB freeze is thereafter released (but the volume remains to be split) to permit normal business affairs to proceed and therefore, the freezing period of DB's can be shortened. The center server 101, on the other hand, freezes the center DB's (shadows 131*a* and 131*b*) at the time that replications of all of the replication local DB's are completed to carry out the synchronization process.

In this manner, business affairs can be continued before the freeze of center DB's is started. After freeze of the center DB's (shadow images 131*a* and 131*b*), the process for synchronization between the replication local DB's 133*a* and 133*b* and the local shadow images 131*a* and 131*b* is carried out but this process replicates only the update bit map and can be ended within a short period of time. (After the synchronization process, the center storage subsystem 103 copies the corresponding records from the replication local DB's 133*a* and 133*b* to the local shadow images 131*a* and 131*b*.)

According to the embodiment of the invention described previously, update of all local DB's can be reflected at a time and hence, data of the individual local DB's can be accessed in a consolidated fashion without causing the data to be mismatched. Further, a request is made to the local server for resynchronization between the local DB and the replication local DB after completion of synchronization with the shadow image, and the update information stored in the local storage subsystem while the local DB is split from the replication local DB is transmitted to the center storage subsystem, thereby ensuring that the update information can again be reflected upon the replication local DB.

According to the foregoing embodiment of the invention, in the DB system comprising a center server, one or more local servers, a first network for connecting the center server and the local servers, local storage subsystems for storing local DB's managed by the local servers, a center storage subsystem for storing replications of the local DB's and a second network for connecting the center server, center storage subsystem, local servers and local storage subsystems, the center server includes a replication requesting unit, a data consolidating unit, a center DB freeze requesting unit, a center DB freeze release requesting unit, a replication source managing table and a data consolidation completion notifying unit, each of the local servers includes a local DB freeze requesting unit, a DB replicating unit, a remote volume split completion notifying unit and a local DB freeze release requesting unit, the center storage subsystem stores replications of the local DB's stored in the local storage subsystems and shadow images of the replicated local DB's and includes a volume replicating unit, a volume splitting unit and a volume synchronizing unit and each of local storage subsystems includes a remote volume replicating unit, a remote volume splitting unit and a remote volume resynchronizing unit through a remote DB cooperating is scheme, whereby a plurality of DB's at remote locations can be accessed instantaneously in a consolidated fashion.

As described above, according to the invention, consolidated access to the plurality of DB's at remote locations can be ensured instantaneously.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A system comprising:
   a first server;
   a plurality of second servers;
   a plurality of second storage subsystems, each of said plurality of second storage subsystems having a second storage volume, as a duplication source volume, to store data sent from corresponding one of said plurality of second storage servers; and a first storage subsystem having a plurality of first storage volumes which include a plurality of duplication destination volumes, each of the plurality of first storage volumes stores replicated data of data stored into said second storage volume, wherein said first server sends a request to each of the plurality of second servers for requesting each of the plurality of second servers to inhibit update of said second storage volume, and accesses said plurality of first storage volumes to which data transfer from said plurality of second storage subsystems is suspended by said request, wherein each of the plurality of second servers sends a request to the corresponding one of said plurality of second storage subsystems for requesting the corresponding one of said plurality of second storage subsystems to stop data transfer to said first storage subsystem in response to said request sent from said first server, and sends a response that indicates the transfer between said first storage subsystem and said second storage subsystems is stopped to said first server, wherein said first storage subsystem further includes:
a plurality of snapshot volumes,
wherein data stored in the snapshot volumes are reflected by data stored in said plurality of duplication destination volumes, wherein said first server sends a synchronization request to said first storage subsystem;

wherein said first storage system, upon receiving said synchronization request, executes a synchronization process that reflects data stored in said plurality of duplication destination volumes to data stored in said plurality of snapshot volumes, and after said synchronization process, sends a request of release of a freeze to said first server, and wherein after receiving said request of release of the freeze to said first server, said first server sends a resynchronization request to each of the plurality of second servers for requesting each of the plurality of second servers to transfer data from said plurality of second storage subsystems to said first storage subsystem.

2. A data control method for a system comprising a first server, a plurality of second servers coupled to the first server, a plurality of second storage subsystems, each of said plurality of second storage subsystems having a second storage volume, as a duplication source volume, to store data sent from a corresponding one of said plurality of second storage servers, and a first storage subsystem coupled to the first storage server and having a plurality of first storage volumes which include a plurality of duplication destination volumes, each of the plurality of first storage volumes stores replicated data of data stored into said second storage volume, the data control method comprising:

by said first server, sending a request to each of the plurality of second servers for requesting each of the plurality of second servers to inhibit update of said second storage volume; and by said first server, accessing said plurality of first storage volumes to which data transfer from said plurality of second storage subsystems is suspended by said request, wherein each of the plurality of second servers sends a request to the corresponding one of said plurality of second storage subsystems for requesting the corresponding one of said plurality of second storage subsystems to stop data transfer to said first storage subsystem in response to said request sent from said first server, and sends a response that indicates the transfer between said first storage subsystem and said second storage subsystems is stopped to said first server, wherein said first storage subsystem further includes:
a plurality of snapshot volumes,
wherein data stored in the snapshot volumes are reflected by data stored in said plurality of duplication destination volumes, wherein said first server sends a synchronization request to said first storage subsystem;

wherein said first storage system, upon receiving said synchronization request, executes a synchronization process that reflects data stored in said plurality of duplication destination volumes to data stored in said plurality of snapshot volumes, and after said synchronization process, sends a request of release of a freeze to said first server, and wherein after receiving said request of release of the freeze to said first server, said first server sends a resynchronization request to each of the plurality of second servers for requesting each of the plurality of second servers to transfer data from said plurality of second storage subsystems to said first storage subsystem.

* * * * *